United States Patent [19]

Fushiya et al.

[11] Patent Number: 4,930,583

[45] Date of Patent: Jun. 5, 1990

[54] PORTABLE BATTERY-POWERED TOOL

[75] Inventors: Fusao Fushiya; Takashi Yamazaki; Mikio Saito, all of Anjo, Japan

[73] Assignee: Makita Electric Works, Ltd., Japan

[21] Appl. No.: 255,824

[22] Filed: Oct. 11, 1988

[30] Foreign Application Priority Data

Feb. 17, 1988 [JP] Japan .................................. 63-34168

[51] Int. Cl.⁵ ................................................ B23B 45/02

[52] U.S. Cl. ...................................... 173/109; 173/117; 173/163; 173/170

[58] Field of Search ............... 173/104, 109, 117, 163, 173/170; 310/50, 47; 320/2

[56] References Cited

U.S. PATENT DOCUMENTS

| | | | |
|---|---|---|---|
| 3,213,305 | 10/1965 | Riley, Jr. et al. | 310/50 |
| 3,456,743 | 7/1969 | Badcock | 173/170 |
| 3,905,429 | 9/1975 | Berger | 173/163 |
| 4,081,704 | 3/1978 | Vassos et al. | 173/163 |
| 4,742,875 | 10/1988 | Bell | 173/117 |
| 4,766,963 | 8/1988 | Hartwig et al. | 173/117 |

FOREIGN PATENT DOCUMENTS

| | | | |
|---|---|---|---|
| 85019127 | 5/1986 | Fed. Rep. of Germany . | |
| 2381605 | 10/1978 | France | 173/104 |

*Primary Examiner*—Douglas D. Watts
*Assistant Examiner*—Scott A. Smith
*Attorney, Agent, or Firm*—Lahive & Cockfield

[57] ABSTRACT

A portable, cordless battery-powered tool with a relatively small overall length is provided. A handle section forms the rearmost part of the tool. An electric motor is located below a spindle and forwardly of the handle section. The motor has a rotatable shaft located in parallel with the spindle. The handle section is provided with a switch trigger which is substantially aligned with the central axis of the spindle at its top.

4 Claims, 2 Drawing Sheets

PORTABLE BATTERY-POWERED TOOL

FIELD OF THE INVENTION

This invention relates to a portable, cordless battery-powered tool.

BACKGROUND OF THE INVENTION

Heretofore a portable, cordless battery-powered tool has typically included (a) an electric motor located to the rear of a spindle and having an axis common to the spindle, (b) a handle section located below the motor, and (c) a battery housing section located forwardly of the handle section. Such a construction is disclosed, for example, in Japanese Patent Application No. 58-144283 which was published by Japanese Official Gazette of Patent Application No. 60-34279.

However, in such a prior art construction, since the motor is located to the rear of the spindle, the entire length of the tool is unavoidably relatively great. Accordingly the tool is not so compact and, hence, the tool is not so easy to use. Also, in such a construction, if the handle section were located to the rear of the motor, the entire length of the tool would become greater. Thus, in such a construction, the handle section is located below the motor. Since the trigger switch for the tool is provided at the handle section, the switch is far from aligned with the axis of the spindle. This makes it still less easy to use the tool or makes it difficult to effectively perform a desired task with the tool.

SUMMARY OF THE INVENTION

It is an object of the invention to provide a portable, cordless battery-powered tool having an electric motor located forwardly of a handle section.

Another object of the invention is to provide a portable, cordless battery-powered tool having a relatively small overall length.

Still another object of the invention is to provide a portable, cordless battery-powered tool which can be easily and effectively used while holding the tool in a well-balanced state.

DETAILED DESCRIPTION OF THE PREFERRED EMBODIMENT

Figure 1:
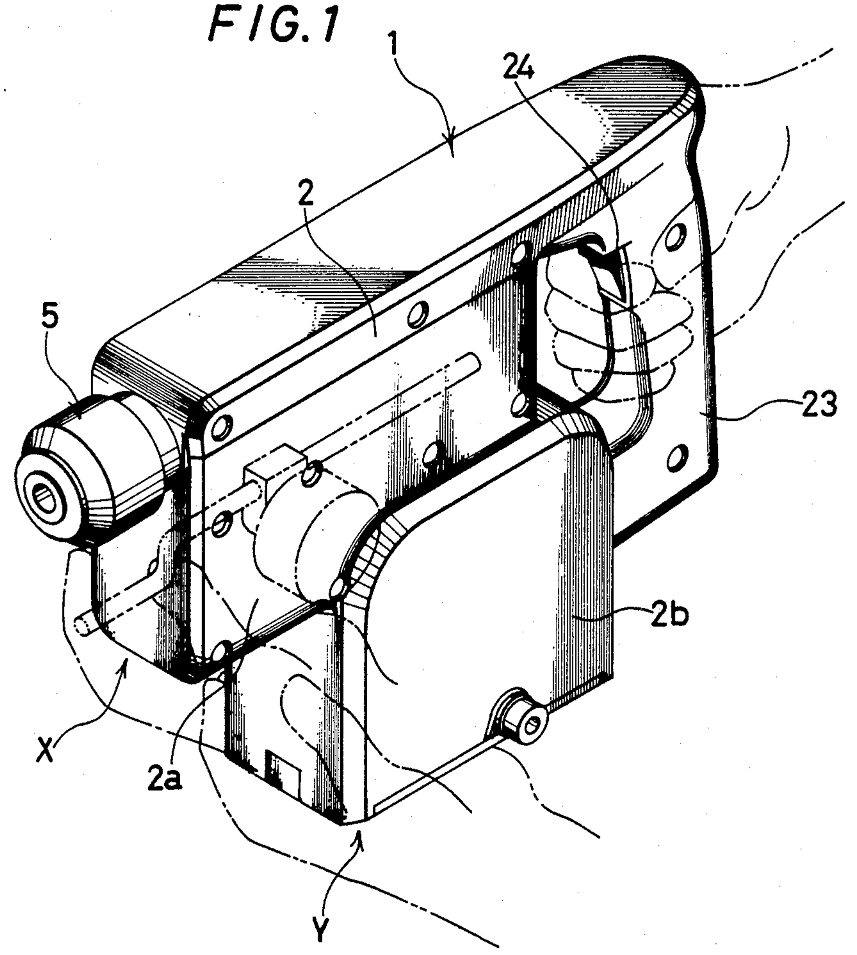
FIG. 1 is a perspective view of a portable, cordless battery-powered tool according to the invention.
Figure 3:
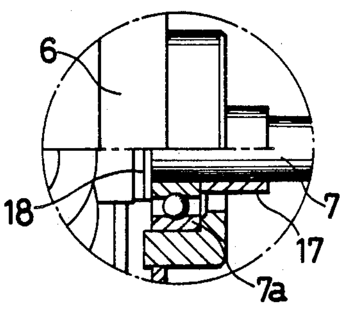
FIG. 3 is an enlarged view of a portion A of FIG. 2.
Figure 2:
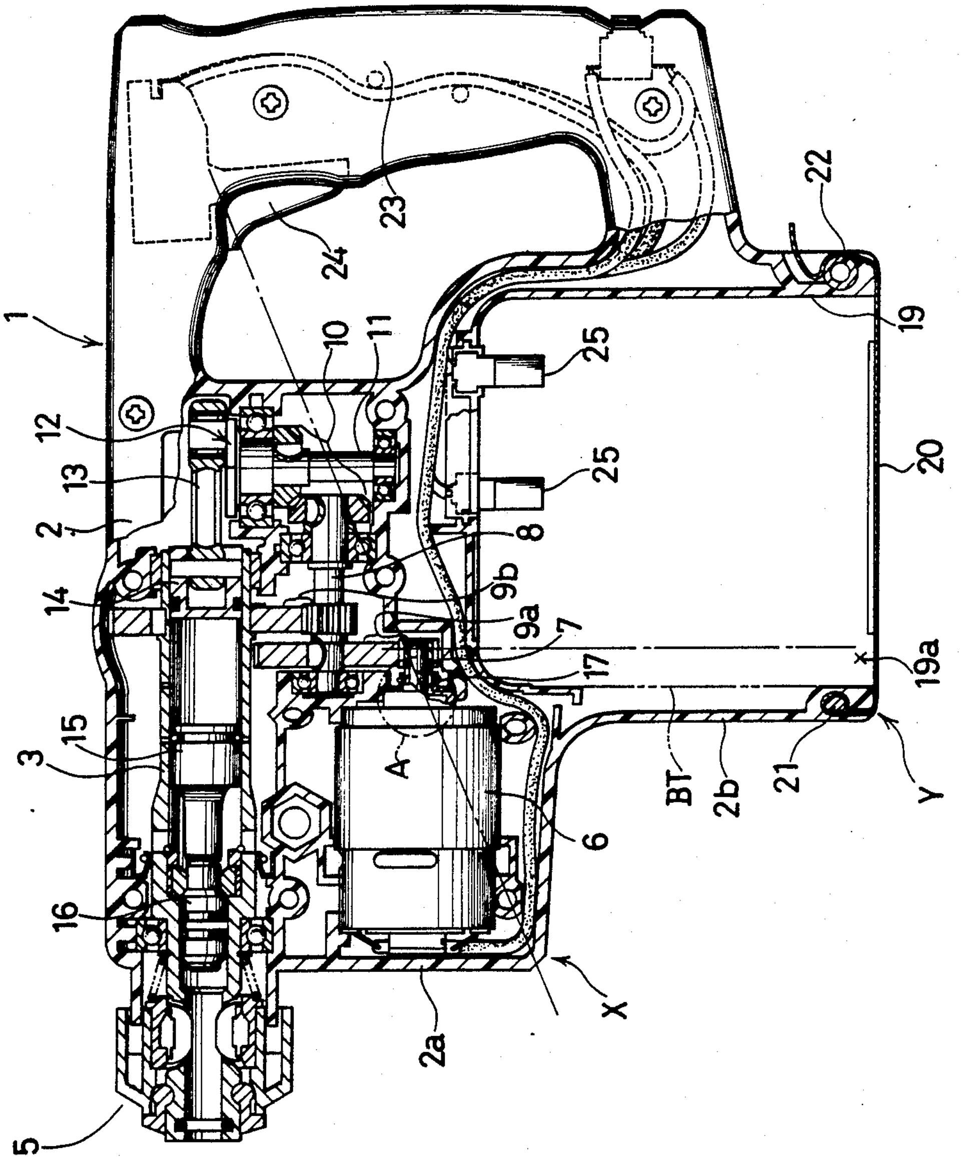
FIG. 2 is a side view of the tool of FIG. 1 wherein the greater part of the tool is shown in its vertical cross section.

Referring now to the drawing, FIGS. 1 to 3 illustrate a battery-operated hammer drill 1 which embodies the invention in a preferred form. The drill 1 includes a housing 2 which comprises a first, upper housing section 2a, a handle section 23 located to the rear of the section 2a, and a second, lower housing section 2b. A hollow rotatable horizontal spindle 3 is provided in an upper space within the upper housing section 2a. The spindle 3 has, at its forward end, a means 5 for holding a boring bit (not shown). The holding means 5 projects from the forward end of the upper housing section 2a. The spindle 3 has a backward end which faces a gear chamber located in a substantially central portion of the upper housing section 2a.

In the upper housing section 2a a direct current motor 6 is located below the spindle 3. The motor 6 has a horizontal rotatable shaft 7 projecting therefrom in a backward direction. The shaft 7 has an axis extending in parallel with the axis of the spindle 3. The shaft 7 has a projecting end which faces the gear chamber. A horizontal rotatable intermediate shaft 8 is provided in the gear chamber. The shaft 8 is parallel to the spindle 3. The shaft 8 is in engagement with the motor shaft 7 through a first reduction gear train 9a, and is in engagement with the spindle 3 through a second reduction gear train 9b. Also, a vertical shaft 11 is located in the gear chamber. The shaft 11 is rotated by the intermediate shaft 8 and a means 10 for transmitting a rotary motion. The shaft 11 is provided with a crank mechanism 12 at its upper end. A horizontal piston rod 13 is formed integrally with the crank mechanism 12 at one end thereof, and is connected to a piston 14 at its other end. The piston 14 is slidably disposed in the hollow spindle 3. Also, in the spindle 3, a striker 15 is provided in front of the piston 14. The striker 15 is spaced apart from the piston 14 by a predetermined distance. Furthermore, in the spindle 3, an impact member 16 is provided in front of the striker 15. Both the striker 15 and the impact member 16 are slideable. A sleeve 17 is press fitted over the projecting end portion of the motor shaft 7. Also, a washer 18 is provided at the back of a bearing 7a which supports the shaft 7. The sleeve 17 and the washer 18 serve to hold the bearing 7a, thus protecting the shaft 7 from an axial backlash.

The lower housing section 2b defines a space 19 for housing a battery BT. The space 19 is located below the gear chamber. The space 19 is opened at its lower end to provide an inlet 19a through which the battery BT is loaded into the space 19. The inlet 19a of the space 19 can be closed with a lid 20 having one end connected to a pivot 21 and an opposed, upwardly-curved end removably engaged with a short rod 22 which is provided at the lower end portion of the lower housing section 2b. The lid 20 may be formed of, for example, elastic steel plate.

As previously mentioned, a handle section 23 is located to the rear of the upper housing section 2a. The handle section 23 is provided with a switch trigger 24 for energizing the motor 6. The trigger 24 has a top which is located below a point aligned with the axis of the spindle 3, but is in close proximity to that point. Thus, it may be said that the trigger 24 is substantially aligned with the axis of the spindle 3 at its top.

Numeral 25 designates terminals to contact the battery BT.

In use, the switch trigger 24 is depressed to operate the motor 6. The motor shaft 7 is rotated to reciprocate the piston 14 within the spindle 3 through the first reduction gear train 9a, the intermediate shaft 8, the transmitting means 10, the vertical shaft 11, the crank mechanism 12 and the piston rod 13. Thus, the striker 15 is moved forward to move the impact element 16 forward. An impact is thus given to the boring bit (not shown) held by the holding means 5. On the other hand, the spindle 3 is rotated through the intermediate shaft 8 and the second reduction gear train 9b, thereby imparting a rotary motion to the boring bit. The boring bit is thus given the two kinds of motion to do its task.

As may be seen from the drawing, the operator holds the handle section 23 by one hand and depresses the switch trigger 24 by a finger thereof. Simultaneously the operator usually supports the front lower edge Y of the lower housing section 2*a* by the other hand. However, if desired, the operator may support the front lower edge X of the upper housing section 2*a* thereby.

The drill 1 can be held in a well-balanced state either when the edge Y is supported by the other hand of the operator or when the edge X is supported thereby. The reason for the possibility of holding the drill in such a state by supporting the edge X is that an approximate center of gravity of the drill exists across an imaginary line connecting a substantially middle portion of the edge X and a portion of the switch trigger 24. The reason for the possibility of holding the drill in such a state by supporting the edge Y is that an imaginary vertical line passing the approximate center of gravity of the drill also passes a substantially middle portion of the edge Y.

Also, since the switch trigger 24 is substantially aligned with the axis of the spindle 3 at its top, the force of the hand of the operator holding the handle section 23 works on the spindle 3 in an ideal manner. Thus the boring operation may be made very effectively with the drill.

Moreover, since the sleeve 17 press fitted over the projecting end portion of the motor shaft 7 holds the bearing **7*a* together with the washer 18 provided at the back of the bearing 7*a* which supports the shaft 7, the motor shaft 7 can be more effectively protected against an axial backlash than the motor shaft of the conventional power tool wherein a plurality of washers are provided, on the side of the carbon brush, for the same purpose. Thus the motor 6** may enjoy a considerably increased service life.

According to the invention, the handle section 23 forms the rearmost section of the drill. The motor 6 is located not at the back of the spindle 3, but below the spindle, and is located forwardly of the handle section. This feature of the invention allows a drill with a relatively short overall length to be manufactured. Therefore a relatively compact and, hence, easy-to-use drill may be obtained.

It will be appreciated by those skilled in the art that, although the invention has been described with reference to the hammer drill which embodies the invention in one preferred form, the invention may be embodied in other kinds of power tools.

What is claimed is:

1. In a portable, cordless battery-powered tool having (a) a spindle to which a bit is to be attached and which has a central axis, (b) an electric motor for imparting a rotary motion to the spindle and moving the bit, said spindle and said electric motor each being housed in a first housing section, (c) a battery housing section and (d) a handle section, the improvement wherein (i) the handle section forms a rearmost part of the tool, (ii) the motor is located forwardly of the handle section, (iii) the motor has a rotatable shaft located in parallel with the spindle, (iv) the battery housing section is located between the handle section and the motor along the direction of the central axis of the spindle, and, (v) the handle section is provided with a trigger means for energizing the motor which is substantially aligned with the central axis of the spindle at its top, said first housing section having a first edge such that the center of gravity of the tool lies along a line between the trigger and said first edge and said battery housing section having a second edge located in a forward and bottom region of said battery housing and intersecting a line which is perpendicular to the central axis and passes through the center of gravity of the tool, so that said tool is balanced in operation when supported by an operator's hand at either one of said first or second edges.

2. A portable cordless battery-powered tool comprising a spindle to which a bit is to be attached and having a spindle axis, a handle section forming a rearmost part of the tool, an electric motor for actuating the spindle, having a rotatable motor shaft parallel to the spindle, said electric motor being located forwardly of the handle, said spindle and said electric motor each being housed in first housing section, a battery housing section located between the handle section and the electric motor along the direction of the central axis of the spindle, and trigger means, located in the handle section, for energizing the motor, said first housing section having a first edge such that the center of gravity of the tool lies along a line between the trigger and said first edge and said battery housing section having a second edge located in a forward and bottom region of said battery housing and intersecting a line which is perpendicular to the central axis and passes through the center of gravity of the tool, so that said tool is balanced in operation when supported by an operator's hand at either one of said first or second edges.

3. A portable cordless battery-powered tool in accordance with claim 2, wherein said trigger means is located in an upper portion of the handle section at a position substantially aligned with the spindle axis, thereby adapting the tool especially for use as a hammer drill.

4. A portable cordless battery-powered tool in accordance with claim 2, wherein said tool is a hammer drill.

* * * * *